Oct. 13, 1970     G. H. PORATH     3,533,316

HYDROSTATIC PRECISION TAILSTOCKS

Filed April 24, 1967     5 Sheets-Sheet 1

INVENTOR
GORDON H. PORATH
BY
Barnes, Kisselle, Raisch & Choate
ATTORNEYS

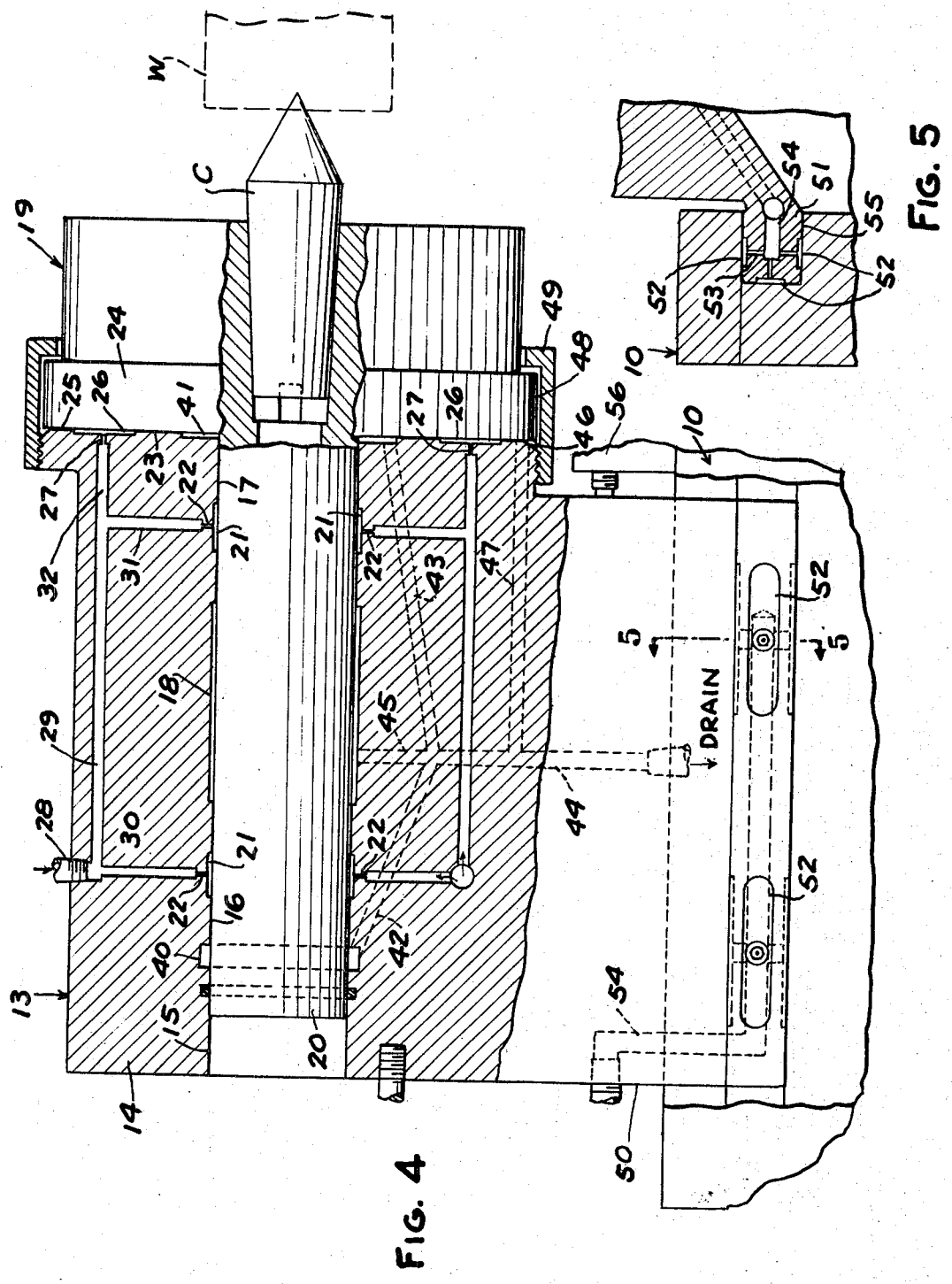

Oct. 13, 1970　　　　　G. H. PORATH　　　　　3,533,316
HYDROSTATIC PRECISION TAILSTOCKS
Filed April 24, 1967　　　　　　　　　　　　　　5 Sheets-Sheet 3
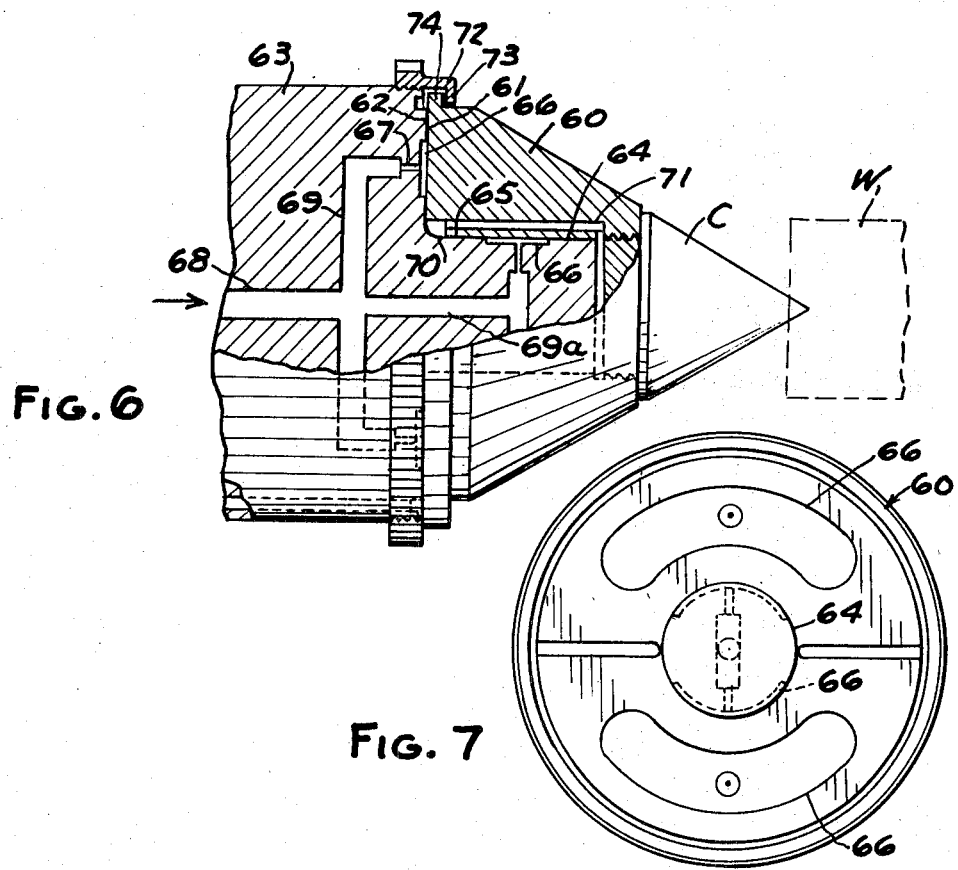
FIG. 6
FIG. 7
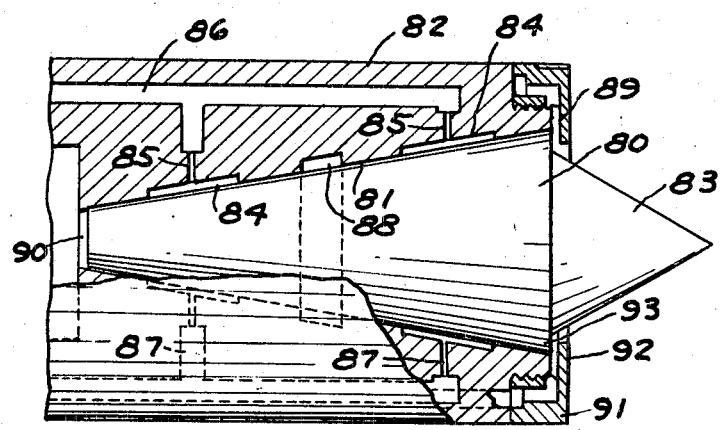
FIG. 8
INVENTOR
GORDON H. PORATH
BY
Barnes, Kisselle, Raisch & Choate
ATTORNEYS INVENTOR.
GORDON H. PORATH
BY
Barnes, Kisselle, Raisch & Choate
ATTORNEYS

United States Patent Office 3,533,316
Patented Oct. 13, 1970

3,533,316
HYDROSTATIC PRECISION TAILSTOCKS
Gordon H. Porath, Livonia, Mich., assignor to The Babcock & Wilcox Company, New York, N.Y., a corporation of New York
Filed Apr. 24, 1967, Ser. No. 633,168
Int. Cl. B23b 3/00
U.S. Cl. 82—2   10 Claims

ABSTRACT OF THE DISCLOSURE

The tailstock disclosed herein comprises a housing in which the workpiece engaging member is either rotatably mounted or fixed. Where the housing is rotatably mounted on a support, a plurality of pressure pads and associated orifices support the workpiece engaging member in stable, accurate, substantially frictionless relation to the housing. In one form, the work engaging member is movable axially toward and away from the workpiece. Several configurations of workpiece engaging members are shown and described. In the form of the tailstock wherein the workpiece engaging member is fixed, it is provided with a plurality of pressure pads and associated restrictors whereby a film of fluid is provided between the workpiece and the workpiece engaging member. The housing is either clamped or supported by a plurality of pressure pads and associated restrictors to facilitate movement of the housing on the machine.

---

This invention relates to tailstocks for supporting the end of a workpiece.

BACKGROUND OF THE INVENTION

It is conventional in machine tools such as lathes, special turning machines and the like, to hold the part at the headstock end in a chuck, collet or similar device. Because it is very common for workpieces to be so long that they are not selfsupporting, the usual practice is to provide what is called a tailstock having a work engaging member, which supports the other end of the part by engaging a center hole or countersink in the workpiece. The tailstock is capable of sliding along the machine base to permit loading and handling. The actual work engaging member is called a "center." Tailstocks are equipped with two types of centers, dead centers in which the center does not rotate, and live centers in which the center does rotate. Each type suffers from certain drawbacks. The dead center is very accurate, but wears rapidly because of the surface friction at the area of engagement. The live center does not wear as rapidly, but is not entirely free from wear because the geometry of the situation frequently dictates the use of smaller bearings than would be desirable in order to handle the axial and radial loads applied. Furthermore, the live center is usually not as accurate as would be desired, especially after it has begun to wear. Finally, the slide for the whole tailstock often produces misalignments and inaccuracies and so induces additional side and moment loads.

It is an object of this invention to provide a precision tailstock which obviates the disadvantages of tailstocks utilizing conventional bearings; wherein the rotor member of the tailstock is maintained in stable, accurate relationship with respect to the housing of the tailstock; wherein the tailstock is mounted on a precision slide that is maintained in stable, accurate, frictionless relationship with respect to the base of the machine; and wherein the tailstock can be utilized for both rough and finish machining.

It is a further object of the invention to provide a tailstock which will not wear out at high speeds and which has a definite safety factor under any forseeable static or dynamic load from the cutting process.

A further object of this invention is to eliminate the susceptibility of the tailstock to damage caused by the operator's common error of applying unnecessarily large thrust loads by setting the tailstock up against the work with excessive force.

A further object is to provide a tailstock mechanism which has as great accuracy as the dead center but which will not burn the nose piece by friction loads.

A final object is to provide a slide mechanism which, by reason of its accuracy of motion, does not induce additional loading on the centers.

SUMMARY

The tailstock disclosed herein comprises a housing in which the workpiece engaging member is either rotatably mounted or fixed. Where the housing is rotatably mounted on a support, a plurality of pressure pads and associated orifices support the workpiece engaging member in stable, accurate, substantially frictionless relation to the housing. In one form, the work engaging member is movable axially toward and away from the workpiece. Several configurations of workpiece engaging members are shown and described. In the form of the tailstock wherein the workpiece engaging member is fixed, it is provided with a plurality of pressure pads and associated restrictors whereby a film of fluid is provided between the workpiece and the workpiece engaging member. The housing is either clamped or supported by a plurality of pressure pads and associated restrictors to facilitate movement of the housing on the machine.

DESCRIPTION OF THE DRAWINGS

FIG. 4 is a fragmentary longitudinal sectional view taken along the line 4—4 in FIG. 2.

FIG. 5 is a fragmentary sectional view taken along the line 5—5 in FIG. 4.

FIG. 6 is a fragmentary part sectional view of a modified form of tailstock.

FIG. 7 is an end view of a portion of the tailstock shown in FIG. 6.

FIG. 8 is a fragmentary part sectional view of a further modified form of a tail stock.

DESCRIPTION

Figure 1:
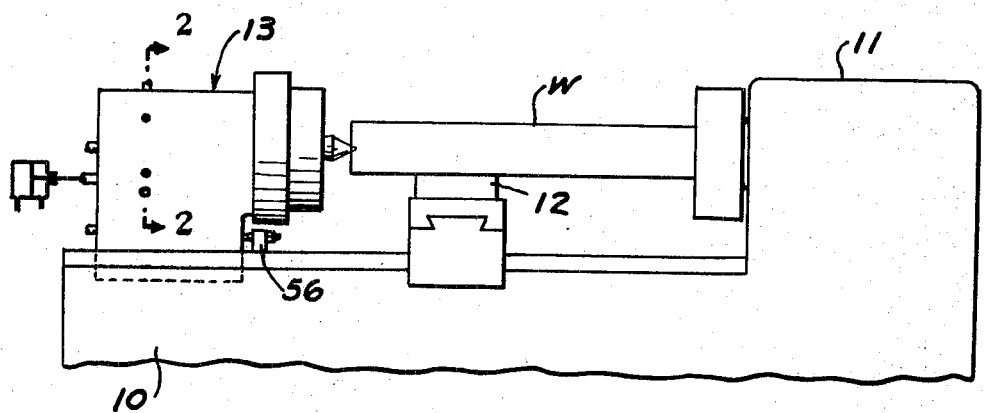
FIG. 1 is a partly diagrammatic elevational view of a machine embodying the invention.

Referring to the drawings, the invention relates to a machine which includes a base 10, a headstock 11 that rotatably engages and drives one end of a workpiece W, a work performing tool on a slide 12, and a tailstock 13 embodying the invention.

The tailstock 13 comprises a housing 14 adjustably mounted on base 10 (FIG. 4). Housing 14 has a cylindrical opening 15 extending longitudinally with respect to base 10 and formed with aligned accurately formed cylindrical surfaces 16, 17 separated by an annular drain groove 18. A rotor member 19 having a work engaging center C includes a shaft portion 20 with a cylindrical surface 20a which is complementary to the surfaces 16, 17. The cylindrical surfaces 16, 17 of the housing 14 are formed with longitudinally spaced sets of circumferentially spaced pressure pads or recesses 21, each of which has a restrictor 22 associated therewith.

Figure 2:
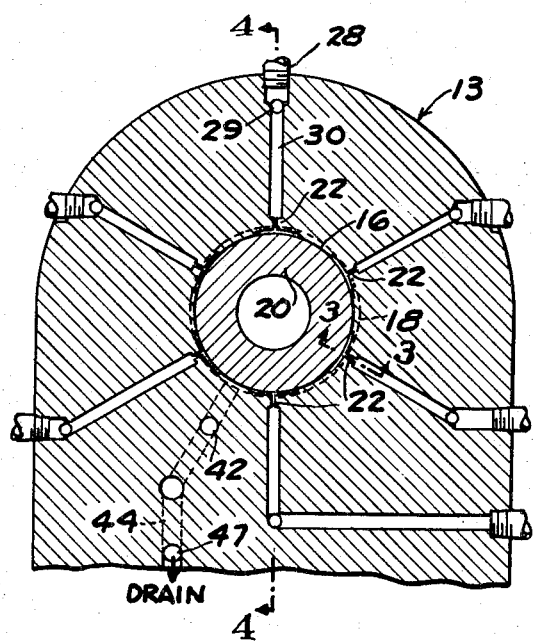
FIG. 2 is a transverse sectional view on an enlarged scale of the rotary portion of the tailstock embodying the invention taken along the line 2—2 in FIG. 1.

The housing 14 also includes an accurately formed radially extending end surface 23. Rotor 19 is formed with a radially extending portion 24 having an accurately formed surface 25 that is complementary to the surface 23. Circumferentially spaced pressure pads 26 are provided on the surface 23 and a restrictor 27 is associated with each pressure pad. The restrictors are shown diagrammatically in FIGS. 2 and 4 and in somewhat more detail in FIG. 3.

Fluid under pressure is supplied to the pressure pads through an inlet 28 and passages 29, 30, 31 and 32. The fluid flows radially outwardly from the pressure pads 21, 26 in a thin film.

Figure 3:
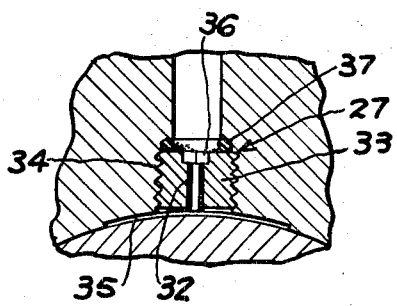
FIG. 3 is a fragmentary sectional view on an enlarged scale taken along the line 3—3 in FIG. 2.

As shown in FIG. 3, each restrictor 27 can comprise a capillary tube or orifice element 32 positioned in a set screw 33 threaded into an opening 34 that communicates with the respective pads. The end 35 of the set screw includes an Allen head depression 36 for engagement by a tool. An O-ring 37 provides a seal. Of course, other types and designs of restrictors and assemblies are usable here.

The size of the restrictors is adjusted so that the pressure in any circumferentially spaced set or group of pads is equal at no load.

Any fluid may be used, but a viscous liquid is preferable. The liquid supplied to each pressure pad in any circumferential group is substantially at the same pressure. Where oil is used, the restrictors can be placed anywhere upstream of the pressure pads. Where air or gas is used, the restrictors should be placed closely adjacent to the pressure pads.

The size of the opening between the complementary surfaces 15, 20a and 23, 26 is preferably such that a thin film of fluid flows at all times in a laminar fashion at low velocity between the surfaces and preferably (but not absolutely essential) substantially all of the pressure of the fluid is dissipated by the time the fluid is passed from the pads to the periphery of the surface in question.

In practice, the space between the surfaces 20, 21 may range between two-thousandths of an inch and one ten-thousandth of an inch and preferably between one-thousandth of an inch and one ten-thousandth of an inch. Although it is preferred that the spacing be the same around the opening, any inaccuracies due to out of round condition will be compensated for provided at least some portions of the surfaces are within the above limits.

The provision of the flow of fluid between the surfaces provides for complete elimination of static friction so that there is no metal-to-metal contact. Any force tending to move the shaft 20 radially is opposed by an increase in pressure in certain of the pads 21 and a corresponding decrease in pressure in the opposed pads 21 which tends to return the shaft to its original position. The pads 26 absorb any axial thrust on the rotor and maintain it in spaced relation to the surface of the housing. If the thrust load on the workpiece increases, the pressure in the pads 26 also increases tending to return the rotor to its original position.

As shown in FIG. 4, an annular drain groove 40 is provided in the surface 15 at one end of the shaft 20 and an annular cutaway portion defines a groove 41 at the other end of the shaft 20. Grooves 40, 41 are connected by drain passages 42, 43 to a passage 44 that extends externally. A drain passage 45 extends from the drain groove 18 to the drain passage 44. A keeper 49 retains the rotor 19 so that it will not move out of the housing under no-load conditions.

At the periphery of the surface 23, a similar drain groove 46 is provided that is connected by a passage 47 to the outlet drain passage 44. A seal 48 of either a rubbing or capillary air type is provided at the end of rotor member 19 opposite the center C, and at the far end of rotor member 20.

As shown in FIGS. 4 and 5, the housing 14 can form a part of a slide 50 that is movable along the base 10 of the machine. Specifically, the slide includes laterally extending longitudinal projections 51 having top, side and bottom surfaces, each of which is formed with longitudinally spaced pressure pockets or pads 52. A restrictor 53 is associated with each pressure pad 52 and fluid under pressure is supplied to the pressure pads 52 through a passage 54. The projections 51 are received in complementary slots 55 in the base 10. A projection 51 is provided on the lower end of each side of the slide 50. When fluid is supplied to the pressure pockets 52, the slide is maintained in precise accurate relation with respect to the base 10. A stop 56 holds the slide 50 and, in turn, the housing 14 in the desired longitudinal position with respect to the base 10.

In use, the tailstock assembly supports the end of the workpiece in stable, accurate rotation so that a more accurate work operation can be performed on the workpiece. In addition, since there is no wear on the parts of the tailstock assembly, it can be used for both rough and finish work operations with long life.

It should be emphasized that the hydrostatic slide 50 can be used alone to improve a conventional tailstock or the hydrostatic housing and assembly 14 can be used alone with a conventional slide, although it appears that the most satisfactory method is to use both together.

In the form of tailstock shown in FIGS. 6 and 7, the rotor 60 comprises a frusto-conical member that has a cone C threaded in the end thereof of which, in turn, engages the workpiece W. The frusto-conical member 60 includes a radial surface 61 which is substantially complementary to a radial surface 62 on the housing 63 and an axially extending cylindrical surface 64 that is complementary to a cylindrical surface 65 on the housing 63. Surfaces 62, 65 are provided with a number of circumferentially spaced pressure pockets or pads 66, each of which has a restrictor 67 associated therewith. Fluid under pressure is provided through an inlet passage 68, cross passage 69 and axial passage 69a to the pressure pads 66 and flows continuously therefrom to drain 70 and drain passages 71. The frusto-conical rotor 60 is maintained in position so that it will not drop off when no fluid is being supplied by a collar 72 which is threaded onto the housing 63 and has a flange 73 engaging a shoulder 74 on the periphery of the member 60.

As in the previous form of the invention, the space between the surfaces 61, 62 and 64, 65 is made within the preferable aforementioned tolerances so that when fluid is supplied under pressure to each pressure pad, it flows in a laminar fashion at low velocity between the surfaces and substantially all the pressure of the fluid is dissipated by the time the fluid is passed from the pads to the periphery of the surface in question. In this fashion, the rotor 60 and, in turn, the cone C are maintained in stable, accurate relation with respect to the housing 63.

In the form of the invention shown in FIG. 8, the rotor member 80 is frusto-conical in shape and tapers radially inwardly into a corresponding frusto-conical opening 81 in the housing 82. The rotor 80 includes a conical tip 83 for engaging the workpiece. The complementary opening 81 in the housing 82 is formed with two or more sets of circumferentially spaced pressure pads or pockets 84, each of which has a restrictor 85 associated therewith. Fluid is supplied under pressure through longitudinally extending passages 86 and transverse passages 87 to the pressure pads. When fluid is being supplied, it flows outwardly from each pressure pad to a central annular drain opening 88, a peripheral drain 89 and a central drain 90. As in the form of the invention shown in FIGS. 6 and 7, in order to prevent the rotor 80 from falling out of the housing when fluid is not being supplied and a workpiece is not in position, a collar 91 is threaded onto the housing and has an inwardly extending flange 92 that engages a shoulder 93 on the rotor 80 in the event that the rotor tends to move outwardly.

As in the previous forms of the invention, when fluid is being supplied to each of the pressure pads, the rotor member is maintained in stable, accurate relationship laterally and longitudinally with respect to the housing.

Figure 10:
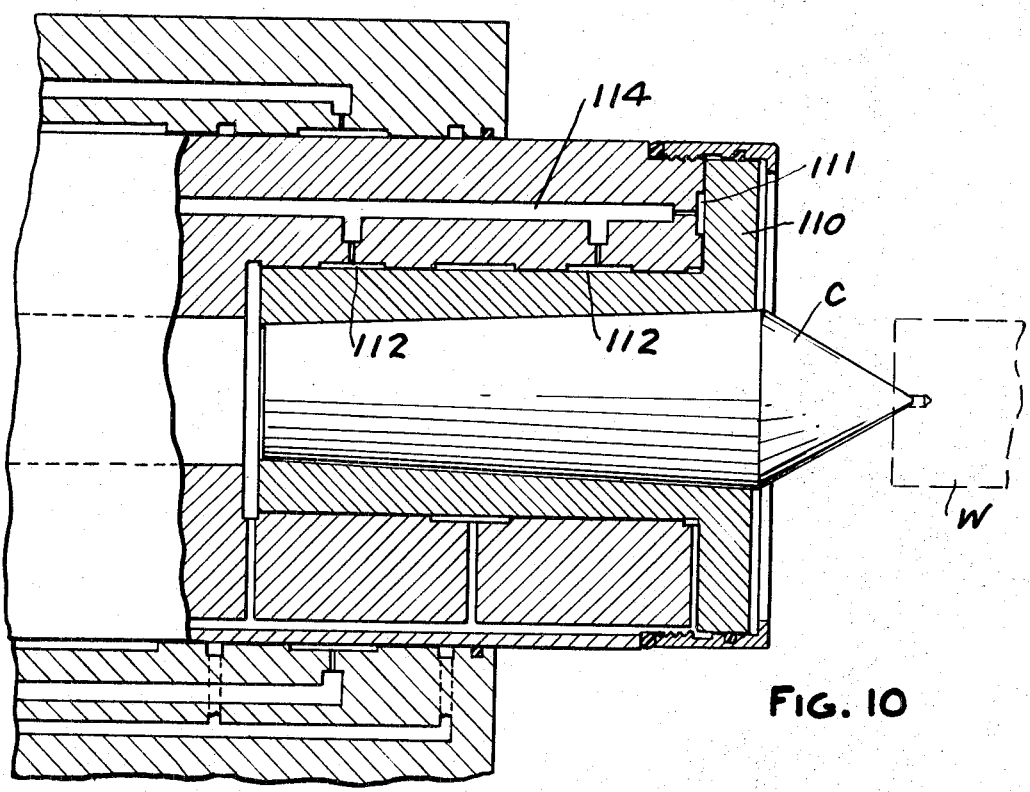
FIG. 10 is a fragmentary sectional view on an enlarged scale of a portion of the tailstock shown in FIG. 9.
Figure 9:
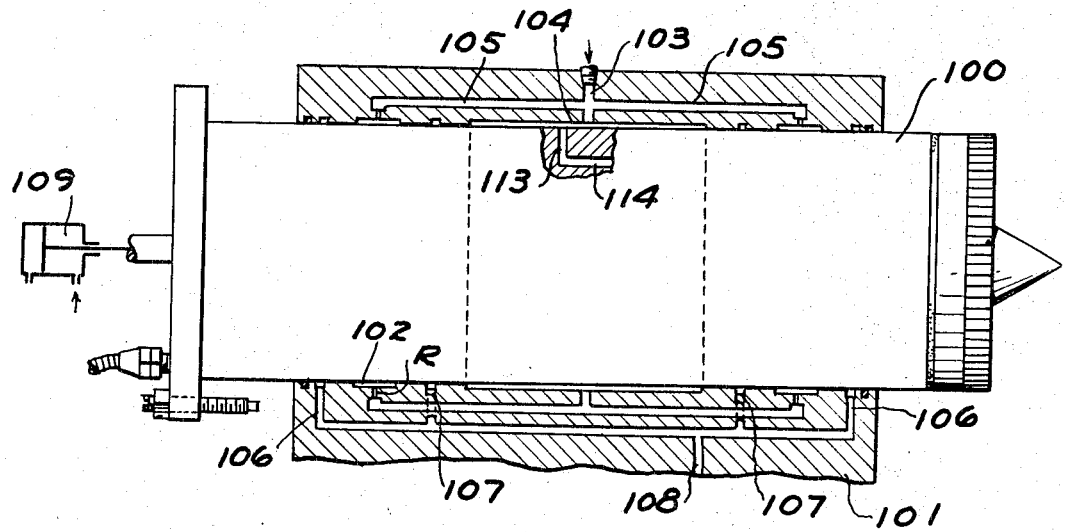
FIG. 9 is a fragmentary sectional view of a modified form of the invention.

In the form of the invention shown in FIGS. 9 and 10, a housing 100 is supported for axial movement in the base 101 by a plurality of sets of circumferentially spaced pressure pads 102 and associated restrictors R. Fluid is supplied to the pressure pads 102 through an inlet 103, an annular passage 104 and axial passages 105. The fluid flows radially outwardly from the pressure pads to drain passages 106, 107 and an outlet drain 108. The housing 100 is adapted to move axially toward and away from the workpiece W by a linear actuator 109. Seals may be provided at the ends of annular passage 104, which must be long enough to continue to pass fluid into rotor 100 over the full axial travel.

The cone C and associated rotor 110 is supported in the housing in the manner of the rotor 19 in FIG. 4, namely, by radial pressure pads 111 and circumferentially spaced pressure pads 112 and associated restrictors. The fluid supply is from inlet 113 and passages 114 from annular passage 104.

Figure 11:
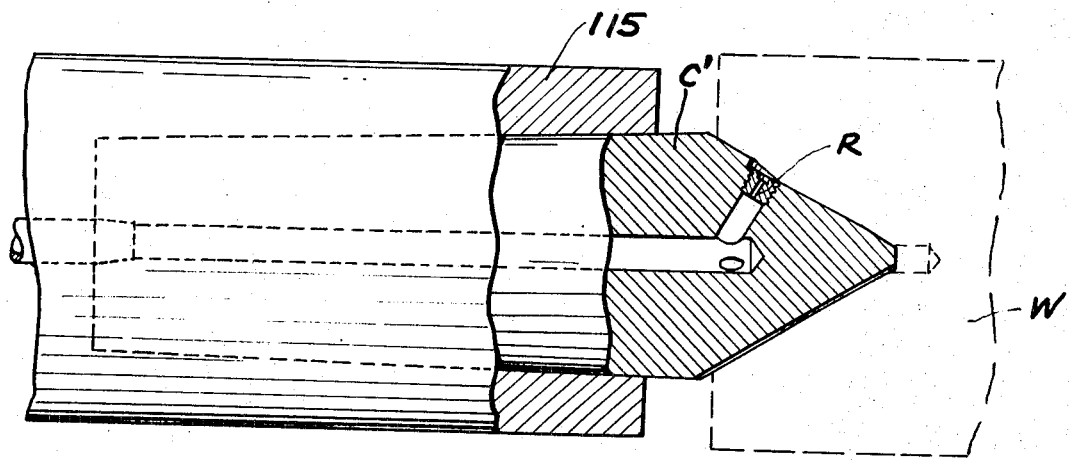
FIG. 11 is a fragmentary part sectional view of a further modified form of tailstock.
Figure 12:
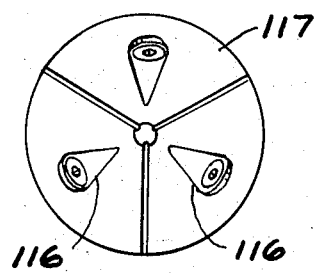
FIG. 12 is an end view of the tailstock shown in FIG. 11.

In the form of the invention shown in FIGS. 11 and 12, the tailstock comprises a cone C' that is fixed in a base 115 and has a plurality of conically shaped pressure pads 116 and associated restrictors in conical surface 117 thereof. When the tailstock is moved adjacent the workpiece and fluid is supplied to the pressure pads, fluid flows in a continuous film between the complementary surfaces of the cone C' and the workpiece W.

Figure 13:
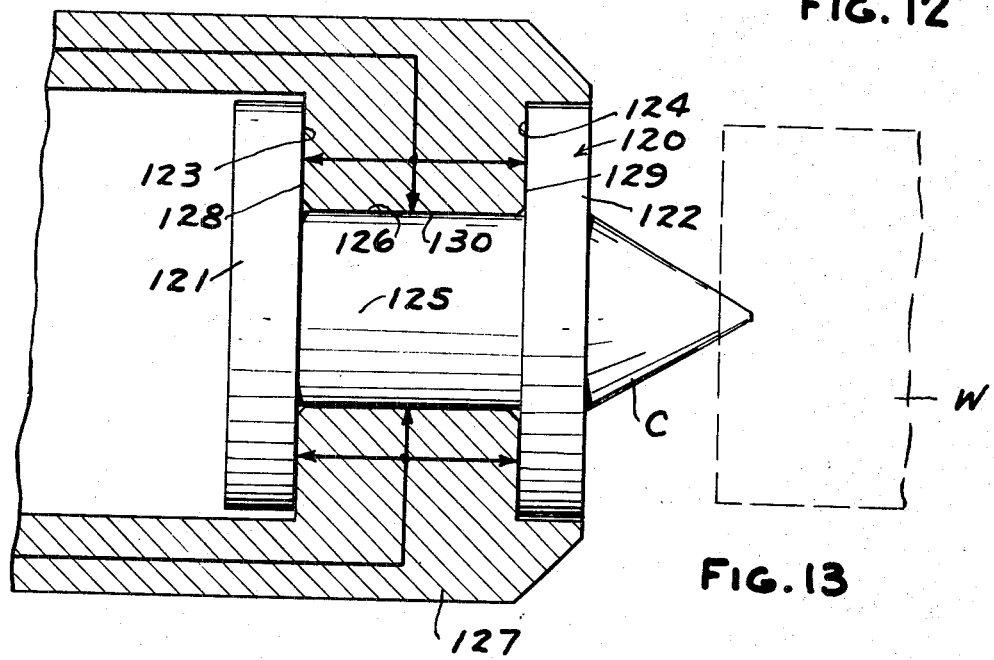
FIG. 13 is a fragmentary part sectional partly diagrammatical view of a further modified form of tailstock.

In the form of the invention shown in FIG. 13, the rotor 120 comprises spaced flanges 121, 122 and radial surfaces 123, 124 and a center section 125 having a cylindrical surface 126. The housing 127 has complementary surfaces 128, 129, 130. Pressure pads and associated restrictors, represented by the arrows, are provided in the surfaces 128, 129, 130 so that a film of fluid flows between the complementary surfaces when fluid is supplied. A cone C is provided on the end of the rotor for engaging a workpiece W.

I claim:

1. The combination comprising
a base,
means on said base for supporting and rotating one portion of a workpiece,
means on said base for performing a work function on said workpiece,
and a tailstock assembly for supporting one end of said workpiece comprising a housing adapted to be adjustably mounted on said base,
said housing having a surface thereon extending longitudinally of said base,
a rotor having means thereon for engaging the end of said workpiece,
said rotor having a complementary surface with said surface of said housing,
said surface of said housing having a plurality of circumferentially spaced pressure pads thereon,
a restrictor associated with each said pressure pad,
means for supplying fluid under pressure to each said restrictor,
the relative dimensions of said complementary surfaces of said housing and said rotor being such that a pressurized film of fluid flows continuously between the surfaces through the pressure pads so that forces on the rotor are balanced by pressure in the pads providing a permanent separation of the surfaces and retaining the rotor in stable and accurate relation to the housing,
at least some of said pads extending other than axially and spacing said work engaging means to provide for thrust support of the rotor,
said surface in said housing being cylindrical,
said housing having a radial surface facing in the direction of said work supporting and rotating means,
said rotor having complementary cylindrical and radial surfaces,
said cylindrical and radial surfaces of said housing having said circumferentially spaced pressure pads thereon,
an annular collar on said housing surrounding the radially extending portion of said rotor and forming a drain for liquid supplied to said pressure pads.

2. The combination set forth in claim 1 including at least two longitudinally spaced sets of said circumferentially spaced pressure pads on said cylindrical surface.

3. The combination set forth in claim 2 including an annular drain groove in said opening between said two sets of pressure pads and a drain passage in said housing extending from said groove.

4. The combination comprising
a base,
means on said base for supporting and rotating one portion of a workpiece,
means on said base for performing a work function on said workpiece,
and a tailstock assembly for supporting one end of said workpiece comprising a housing adapted to be adjustably mounted on said base,
said housing having a surface thereon extending longitudinally of said base,
a rotor having means thereon for engaging the end of said workpiece,
said rotor having a complementary surface with said surface of said housing,
said surface of said housing having a plurality of circumferentially spaced pressure pads thereon,
a restrictor associated with each said pressure pad,
means for supplying fluid under pressure to each said restrictor,
the relative dimensions of said complementary surfaces of said housing and said rotor being such that a pressurized film of fluid flows continuously between the surfaces through the pressure pads so that forces on the rotor are balanced by pressure in the pads providing a permanent separation of the surfaces and retaining the rotor in stable and accurate relation to the housing,
at least some of said pads extending other than axially and spacing said work engaging means to provide for thrust support of the rotor,
said surface in said housing comprising a frusto-conical opening with longitudinally spaced sets of pressure pads therein,
said complementary surface of said rotor being frusto-conical.

5. The combination set forth in claim 4 including a collar engaging said rotor and preventing axial movement of said rotor out of said housing when there is no load on said rotor and when fluid is not being supplied to said rotor.

6. For use with a machine having a base, means on said base for supporting and rotating one portion of a workpiece, and means on said base for performing a work function on said workpiece,
a tailstock assembly for supporting one end of said workpiece comprising
a housing adapted to be adjustably mounted on said base,
said housing having a surface therein,
a rotor having means thereon for engaging the end of a workpiece, said rotor having a complementary surface with said surface of said housing, said surface of said housing having a plurality of circumferentially spaced pressure pads therein, a restrictor associated with each said pressure pad, means for supplying fluid under pressure to each said restrictor, the relative dimensions of said complementary surfaces of said housing and said rotor being such that a pressurized film of fluid flows continuously between the surfaces through the pressure pads so that forces on the rotor are balanced by pressure in the pads providing a permanent separation of the surfaces and retaining the rotor in stable, accurate relation to the housing, at least some of said pads extending other than axially and spacing said work engaging means to provide for thrust support of the rotor, said surface in said housing being cylindrical, said housing having a radial surface adapted to face in the direction of the work supporting and rotating means of the machine, said rotor having complementary cylindrical and radial surfaces, said cylindrical and radial surfaces of said housing having circumferentially spaced pressure pads thereon, an annular collar on said housing surrounding the radially extending portion of said rotor and forming a drain for liquid supplied to said pressure pads.

7. The combination set forth in claim 6 including at least two longitudinally spaced sets of said circumferentially spaced pressure pads on said cylindrical surface.

8. The combination set forth in claim 7 including an annular drain groove in said opening between said two sets of pressure pads and a drain passage in said housing extending from said groove.

9. For use with a machine having a base, means on said base for supporting and rotating one portion of a workpiece, and means on said base for performing a work function on said workpiece, a tailstock assembly for supporting one end of said workpiece comprising a housing adapted to be adjustably mounted on said base, said housing having a surface therein, a rotor having means thereon for engaging the end of a workpiece, said rotor having a complementary surface with said surface of said housing, said surface of said housing having a plurality of circumferentially spaced pressure pads therein, a restrictor associated with each said pressure pad, means for supplying fluid under pressure to each said restrictor, the relative dimensions of said complementary surfaces of said housing and said rotor being such that a pressurized film of fluid flows continuously between the surfaces through the pressure pads so that forces on the rotor are balanced by pressure in the pads providing a permanent separation of the surfaces and retaining the rotor in stable, accurate relation to the housing, at least some of said pads extending other than axially and spacing said work engaging means to provide for thrust support of the rotor, said surface in said housing comprising a frusto-conical opening with longitudinally spaced sets of pressure pads therein, said complementary surface of said rotor being frusto-conical.

10. For use with a machine having a base, means on said base for supporting and rotating one portion of a workpiece, and means on said base for performing a work function on said workpiece, a tailstock assembly for supporting one end of said workpiece comprising a housing adapted to be adjustably mounted on said base, said housing having a surface therein, a rotor having means thereon for engaging the end of a workpiece, said rotor having a complementary surface with said surface of said housing, said surface of said housing having a plurality of circumferentially spaced pressure pads therein, a restrictor associated with each said pressure pad, means for supplying fluid under pressure to each said restrictor, the relative dimensions of said complementary surfaces of said housing and said rotor being such that a pressurized film of fluid flows continuously between the surfaces through the pressure pads so that forces on the rotor are balanced by pressure in the pads providing a permanent separation of the surfaces and retaining the rotor in stable, accurate relation to the housing, said complementary surfaces of said housing and rotor comprising a cylindrical surface on said housing, a cylindrical opening in said rotor, said pressure pads being on said cylindrical surface of said housing, said housing including a radially extending surface having circumferentially spaced pressure pads and associated restrictors thereon, said rotor having a complementary radial surface to said last-mentioned surface.

References Cited

UNITED STATES PATENTS

| 1,479,952 | 1/1924 | Boyce | 82—33 |
| 3,090,173 | 5/1963 | Strickland et al. | 51—237 |
| 3,200,671 | 8/1965 | Porath | 90—11 |
| 3,269,063 | 8/1966 | Hahn et al. | 82—30 XR |
| 3,292,467 | 12/1966 | Heer | 82—31 |

FOREIGN PATENTS

| 1,332,412 | 6/1963 | France. |
| 1,034,454 | 7/1958 | Germany. |
| 1,209,403 | 1/1966 | Germany. |

LEONIDAS VLACHOS, Primary Examiner

U.S. Cl. X.R.

82—30, 31; 308—9